United States Patent [19]
Lieb

[11] Patent Number: 5,589,958
[45] Date of Patent: Dec. 31, 1996

[54] KITCHEN ENSEMBLE HAVING WINDOWS WITH CONTROLLABLE OPACITY

[76] Inventor: Joseph A. Lieb, 311 Wynne La., Narberth, Pa. 19072

[21] Appl. No.: 386,170

[22] Filed: Feb. 9, 1995

[51] Int. Cl.⁶ ............ G02F 1/13; G02F 1/1333; A47F 3/00; A47F 3/06
[52] U.S. Cl. ............ 349/16; 312/114; 312/128; 312/138.1; 312/204; 349/58
[58] Field of Search ............... 359/51, 52, 36, 359/83; 312/114, 128, 138.1, 204

[56] References Cited

U.S. PATENT DOCUMENTS

| | | | |
|---|---|---|---|
| 3,898,977 | 8/1975 | Draper | 126/200 |
| 4,435,047 | 3/1984 | Ferguson | 359/52 |
| 4,435,048 | 3/1984 | Kamimori | 359/275 |
| 4,671,618 | 6/1987 | Wu | 359/52 |
| 4,673,255 | 6/1987 | West | 359/51 |
| 4,685,771 | 8/1987 | West | 359/46 |
| 4,688,900 | 8/1987 | Doane | 359/52 |
| 4,728,547 | 3/1988 | Vaz | 428/1 |
| 4,749,261 | 6/1988 | McLaughlin et al. | 359/51 |
| 4,775,221 | 10/1988 | Baumgartner | 359/44 |
| 4,775,226 | 10/1988 | Montgomery | 359/43 |
| 4,775,227 | 10/1988 | Silver | 359/273 |
| 4,818,043 | 4/1989 | Bolger | 312/138 R |
| 4,818,070 | 4/1989 | Gunjima | 359/93 |
| 4,834,509 | 5/1989 | Gunjima | 359/52 |
| 4,845,329 | 7/1989 | Vaz | 219/770 |
| 4,938,568 | 7/1990 | Margerum | 359/51 |
| 4,940,297 | 7/1990 | Borgen | 312/138.1 |
| 4,946,263 | 8/1990 | Vaz | 359/84 |
| 4,971,719 | 11/1990 | Vaz | 252/299.5 |
| 5,021,188 | 6/1991 | Vaz | 252/299.5 |
| 5,096,282 | 3/1992 | Margerum | 359/3 |
| 5,123,192 | 6/1992 | Hsieh | 359/36 |
| 5,235,150 | 8/1993 | Buske et al. | 219/722 |
| 5,410,949 | 5/1995 | Yung | 99/348 |

OTHER PUBLICATIONS

Marvin Windows & Doors brochure: "Marvin Gives You Privacy at the Flip of a Switch".
3M Company brochure: "Glass made with 3M Privacy Film", 1994.
Viracon, Inc. brochure: "Viracon Privacy Glass", 1994.

*Primary Examiner*—Wael Fahmy
*Assistant Examiner*—Fetsum Abraham
*Attorney, Agent, or Firm*—William H. Eilberg

[57] ABSTRACT

A kitchen ensemble includes one or more appliances and one or/more cabinets. Some or all of the appliances and cabinets have windows made of a material having a controllable opacity. The windows are opaque in the normal state, but can be made transparent by operation of a suitable control. Therefore, one can view the contents of the cabinets and/or appliances without opening any doors. The invention therefore enhances the convenience of using the kitchen, and saves energy by minimizing the number of times a refrigerator or range door is opened. It also enhances the aesthetic qualities of the kitchen.

32 Claims, 4 Drawing Sheets

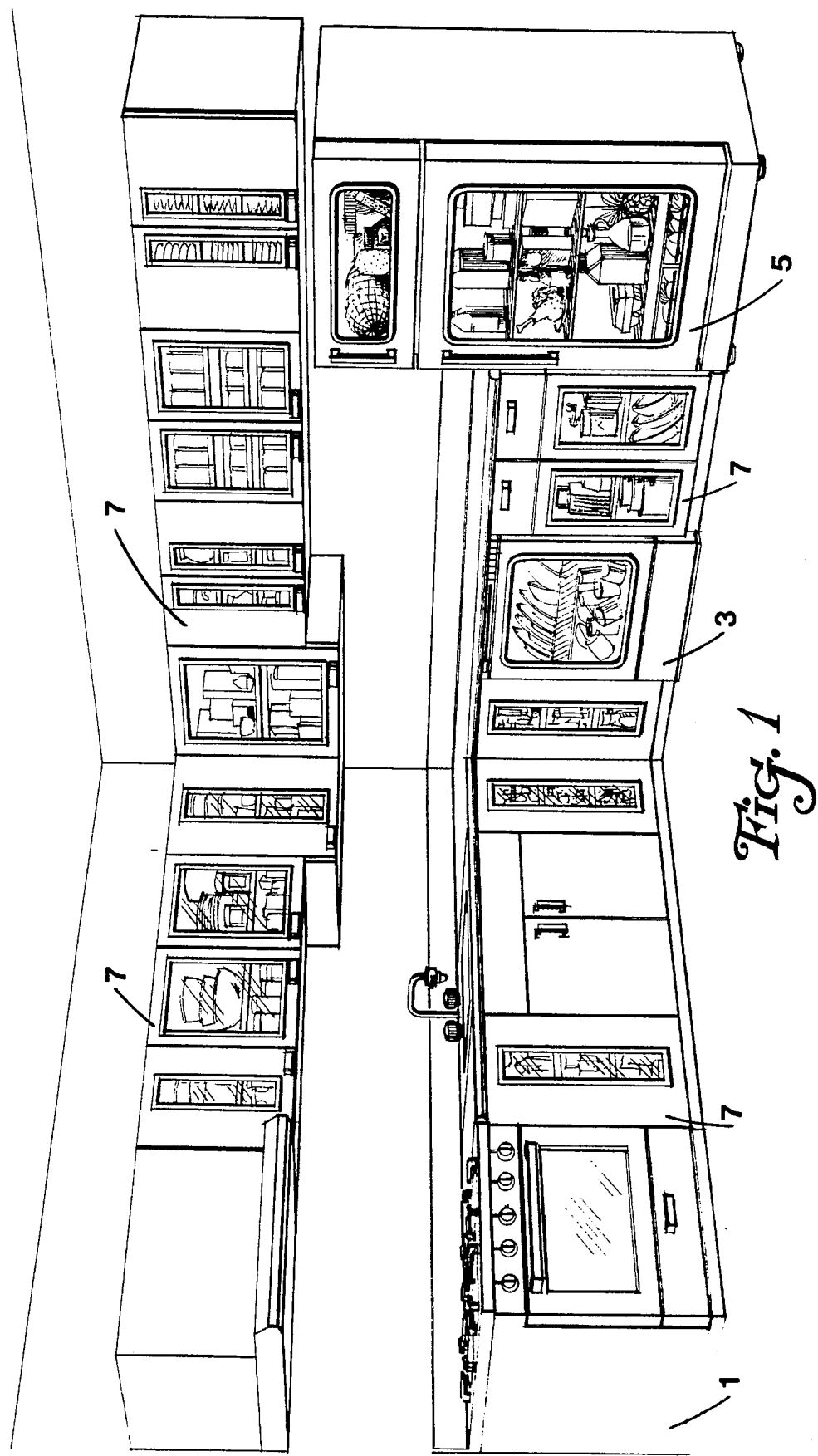

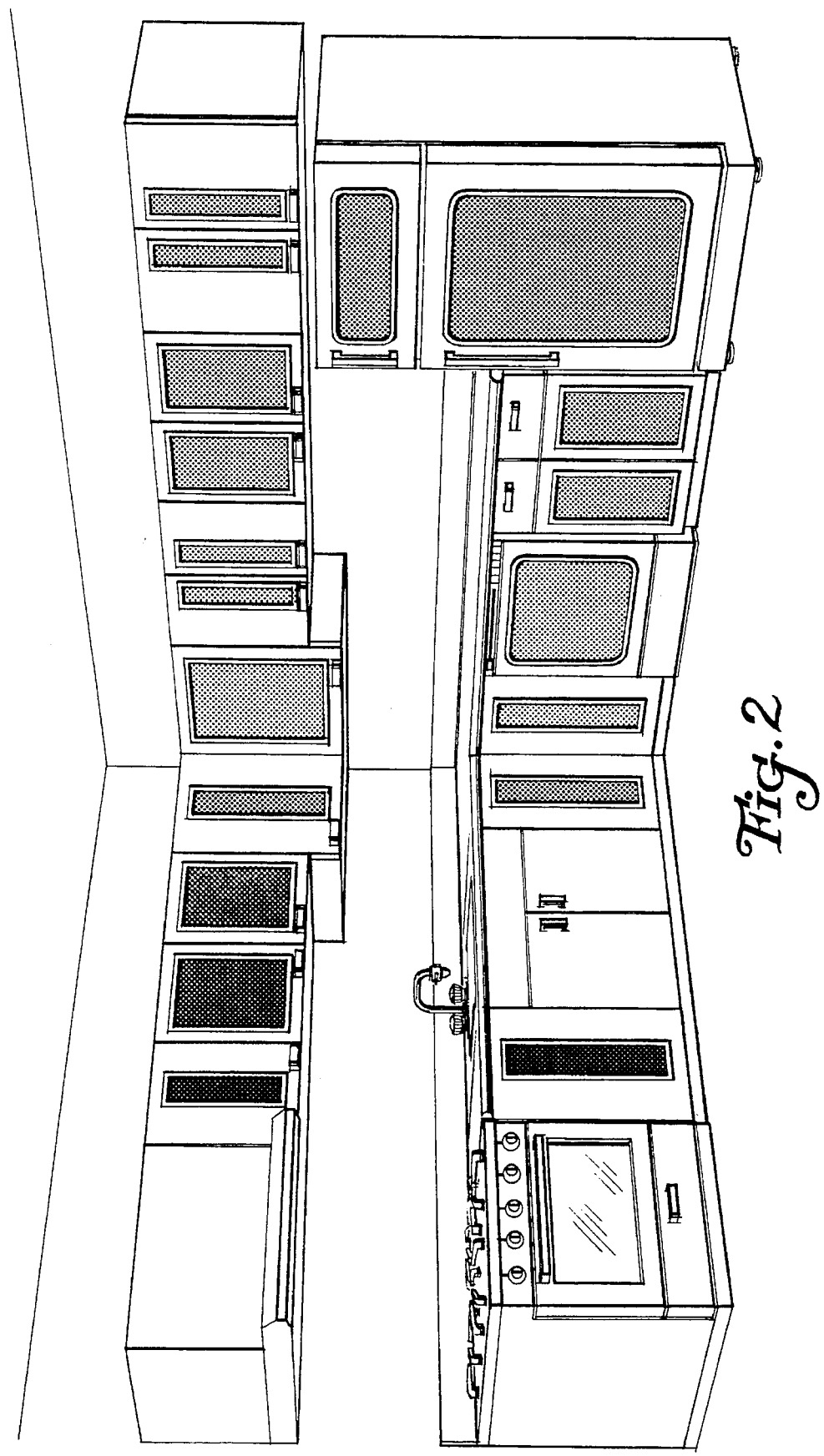

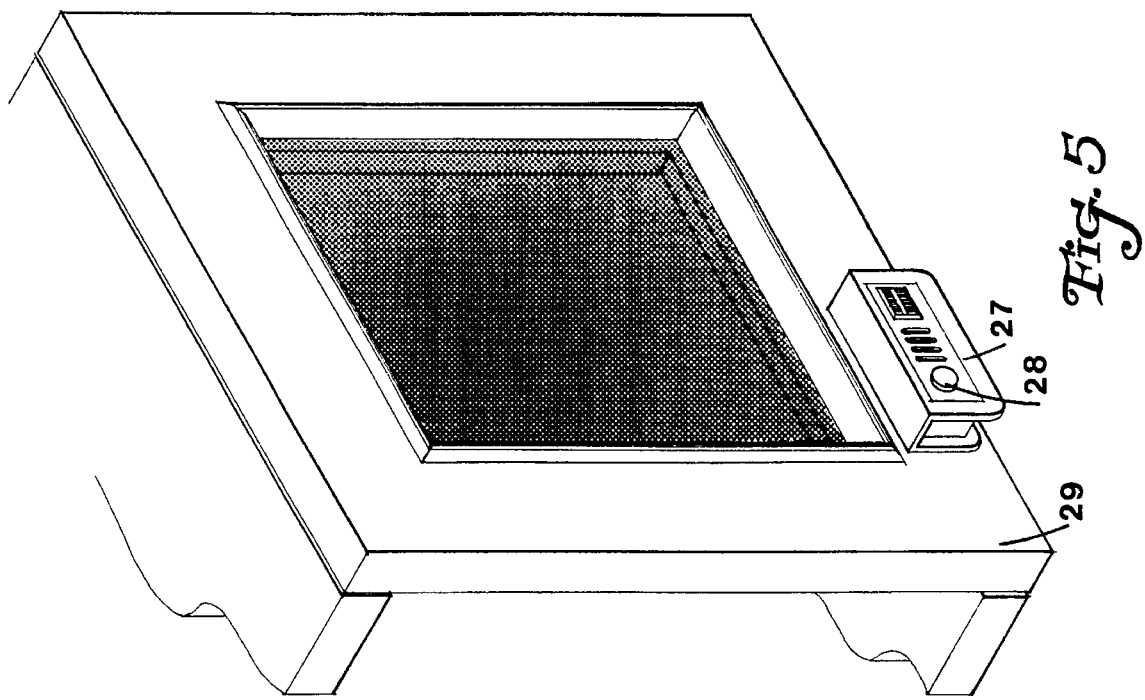
Fig. 5
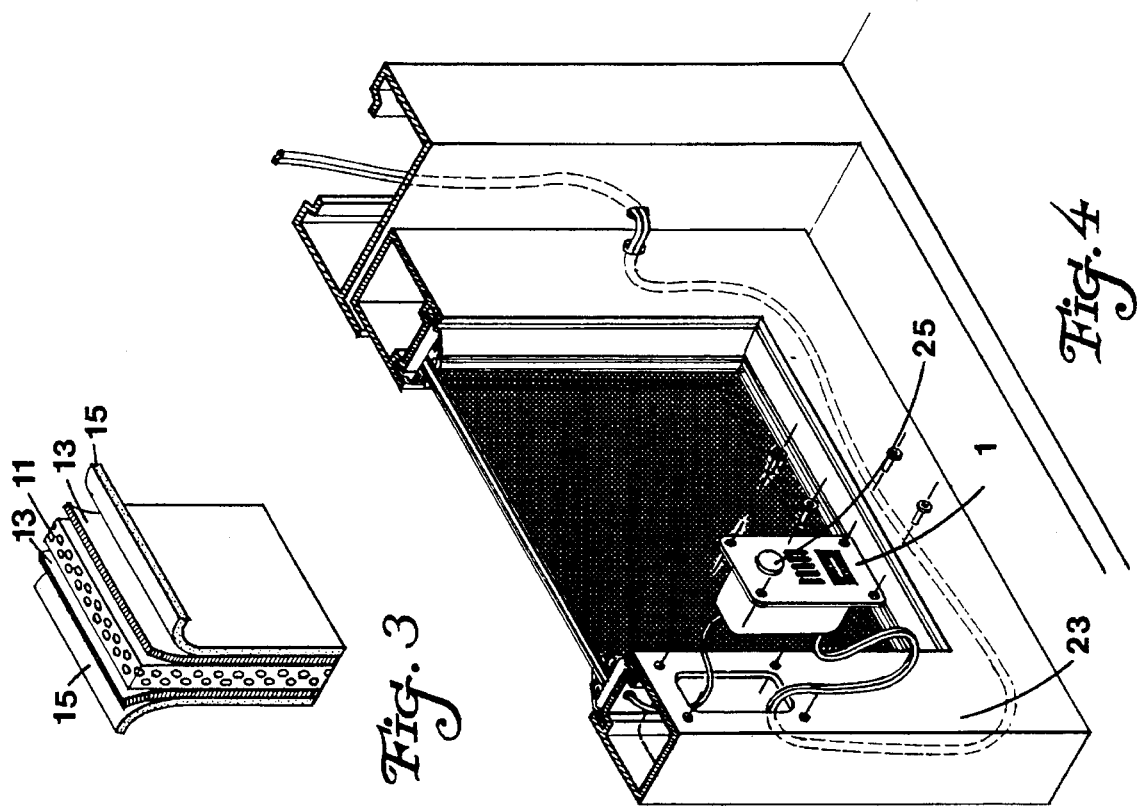
Fig. 3
Fig. 4

KITCHEN ENSEMBLE HAVING WINDOWS WITH CONTROLLABLE OPACITY

BACKGROUND OF THE INVENTION

This invention relates to kitchens or other rooms having a plurality of appliances and/or cabinets, and provides a means of viewing the interior of the appliances and/or cabinets without opening them.

Kitchens typically have a set of appliances and cabinets, most or all of which have doors. These doors are usually not transparent; they are typically made of wood, plastic, or metal. In order to see what is inside a particular appliance or cabinet, it is necessary to open its door. If one does not know where a particular item is stored, it can be very inconvenient and time-consuming to open every door to find the item. Also, opening the door of a refrigerator or range allows unwanted heat transfer, increasing the cost of operating the appliance.

The present invention solves the above-described problem by providing a kitchen ensemble in which the contents of some or all of the appliances and/or cabinets can be immediately observed, without the need to open a single door.

SUMMARY OF THE INVENTION

In the preferred embodiment, the present invention comprises a kitchen ensemble having a plurality of appliances and a plurality of cabinets. At least some of the appliances and at least some of the cabinets have windows. The windows are made of a material having a controllable opacity, such as a polymer-dispersed liquid crystal (PDLC). Each window is associated with a device which alters the opacity of the window. By actuating the device, one can change the state of the window from clear to opaque, or from opaque to clear. The result is that one can view the contents of any or all of the appliances and/or cabinets, without opening any of the doors.

The windows can be controlled together by a single control which changes the states of the windows simultaneously. Alternatively, each of the windows can have a separate controller which affects the opacity of a single window only. The windows are normally in the opaque state, but are made temporarily transparent by operation of the control.

The windows can be switched by any of a variety of different kinds of devices. For example, the opacity of the windows could be changed according to electrical, ultrasonic, infrared, photoelectric, remote control, auditory, or motion sensing mechanisms.

In another embodiment, the invention includes a display apparatus which includes a plurality of windows, each window being made of PDLC material and being individually controlled by a computer. The computer is programmed with one or more patterns, and creates such patterns by controlling the state of each of the windows. The display apparatus can have the form of a billboard, or it can have the form of a building with many windows.

The invention therefore has the primary object of providing a kitchen ensemble having a plurality of appliances and/or cabinets, in which is it possible to view the contents of the appliances or cabinets without opening them.

The invention has the further object of providing a kitchen ensemble having a plurality of appliances and/or cabinets, wherein the appliances and cabinets have windows, and wherein the windows can be maintained in an opaque condition when desired.

The invention has the further object of reducing the expenditure of energy, by reducing the number of times that an appliance door must be opened.

The invention has the further object of improving the aesthetic qualities of a kitchen ensemble.

The invention has the further object of providing a display apparatus which has a plurality of windows of controllable opacity, and wherein the state of each window is controlled by a computer.

The reader will recognize other objects and advantages of the invention, from a reading of the brief description of the drawings, the detailed description of the invention, and the appended claims.

BRIEF DESCRIPTION OF THE DRAWINGS

FIG. 1 provides a perspective view of a kitchen ensemble, made according to the present invention, showing all of the windows in the transparent condition.

FIG. 2 provides a view similar to that of FIG. 1, but with the windows in the opaque condition.

FIG. 3 provides a perspective view of a polymer dispersed liquid crystal used in the present invention.

FIG. 4 provides a fragmentary, exploded, perspective view showing the attachment of a control device to a window, or to an appliance or cabinet door, according to the present invention.

FIG. 5 provides a fragmentary perspective view showing an appliance door with a control device which also comprises the door handle.

DETAILED DESCRIPTION OF THE INVENTION

Figure 6:
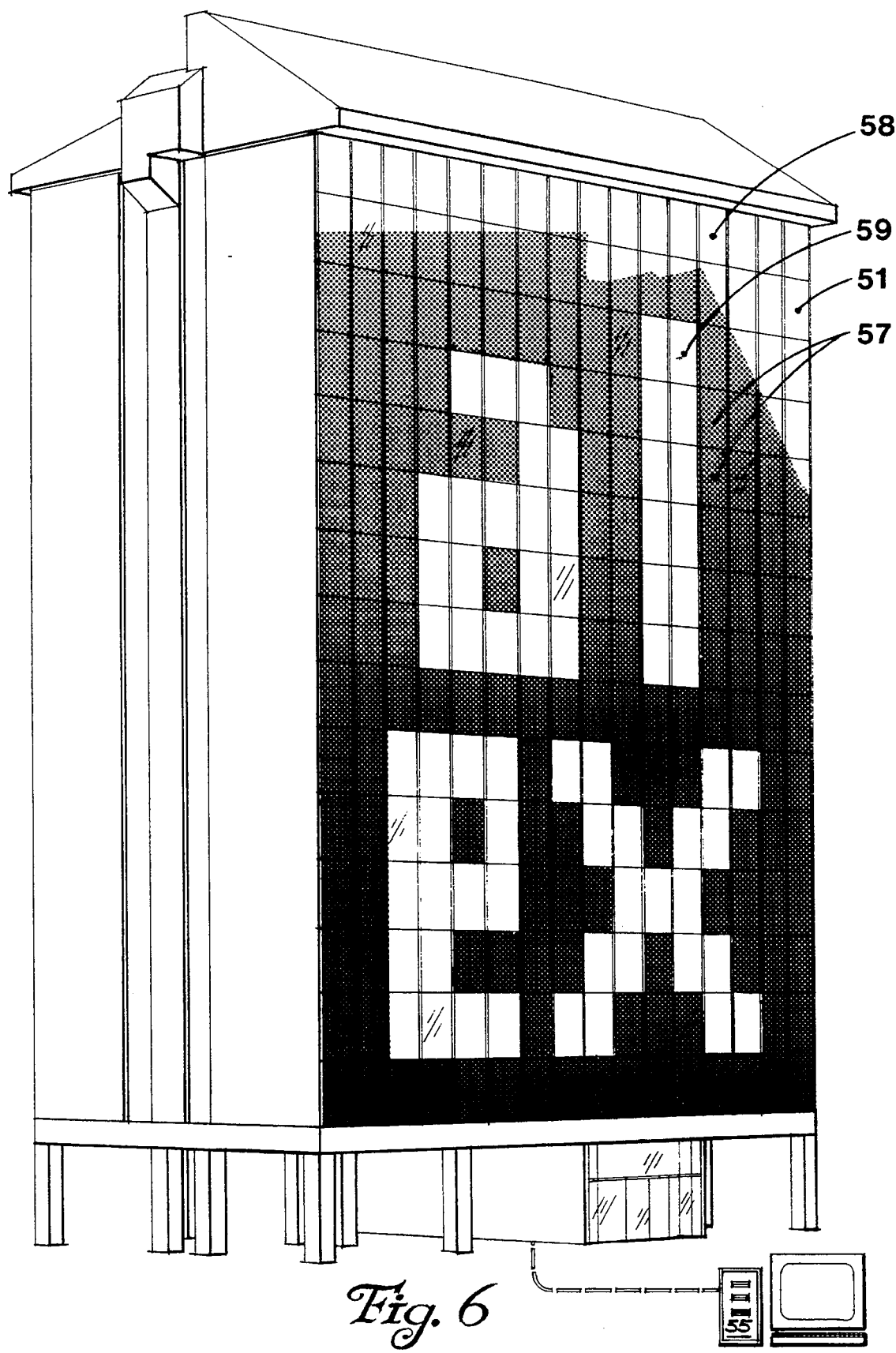
FIG. 6 provides a perspective view of another embodiment of the invention, wherein a billboard is made of a plurality of windows, each having a separately controlled opacity.

The present invention, as illustrated generally in the perspective views of FIGS. 1 and 2, comprises a kitchen ensemble including a plurality of kitchen components which include appliances and cabinets. At least some of the appliances and some of the cabinets have windows. The windows are made of a material whose opacity can be controlled, so that the windows are substantially transparent in one state, as shown in FIG. 1, and substantially opaque in another state, as shown in FIG. 2.

In the embodiment shown, the appliances include a range 1, a dishwasher 3, and a refrigerator 5. A plurality of cabinets 7 are disposed throughout the kitchen. Virtually any combination of cabinets and appliances can be used, within the scope of the present invention.

The material used for the windows can be an electrochromic polymer dispersed liquid crystal (PDLC) film. A PDLC film is described in U.S. Pat. No. 5,096,282, the disclosure of which is incorporated by reference herein. One can use a PDLC film to make doors for refrigerators, freezers, ovens, cabinets, closet doors, and the like. By altering the opacity of the material forming the doors, one can view the contents of a kitchen appliance, or cabinet or closet, while the door is still closed, without the need to touch the object being viewed.

A variety of switching devices can be used, depending on the needs of a particular application, to change the opacity of the PDLC film. These include electrical, photoelectric, remote control, auditory, and motion sensing mechanisms.

Using electrochromic PDLC panels in the manufacture of household appliances and doors has the advantages of enhanced accessibility, conservation of energy (especially for refrigeration and cooking units), and aesthetic improvement. Altering the opacity of the PDLC film allows concealment of the relatively unaesthetic interiors of certain appliances, such as conventional ovens, microwave ovens, and dishwashers, while permitting periodic visual inspection of their contents with minimal effort. Moreover, the electrochromic properties of the PDLC offer a variety of colors and shades to be selected by the user, according to individual taste.

FIG. 3 shows the structure of the windows used in the present invention. The window comprises liquid crystal impregnated material 11 sandwiched between two transparent, electrically addressable outer layers 13. A third, outermost layer 15 is usually made of protective glass. FIG. 3 illustrates these layers in a "peeled away" configuration for ease of description. Due to the manner of making the film, the film can be switched electrically from an opaque "off" state to a highly transparent "on" state.

FIGS. 4 and 5 illustrate two means of mounting a controller to an appliance or cabinet door. In FIG. 4, controller 21 is mounted substantially flush with frame 23 of the door. Button 25 is used to switch the state of the window. In FIG. 4, controller 27 is mounted to door 29 in such a manner as to comprise a handle for the door. Button 28 enables the user to switch the state of the window. The mounting techniques shown in FIGS. 4 and 5 could also be used where the invention controls the opacity of an ordinary window. It is possible to provide a photoelectric sensor (not shown) which automatically changes the opacity of the window of a home or other building, according to the amount of ambient light.

The PDLC product used in this invention is a thin, optically responsive material, comprising droplets or bubbles of liquid crystal (LC) dispersed in an electron beam curable or light transmissive flexible plastic sheet or film, as shown in U.S. Pat. Nos. 5,021,188 and 4,971,719, the disclosures of which are incorporated by reference herein. The film is formed between two sheets of flat glass, plastic optical plates, or other suitable substrate, which include a transparent electrode assembly.

PDLC film produced in the above-described manner may be thermally, electrically, magnetically, or electromagnetically controlled to alter its opacity, thereby switching the material from a light scattering mode to a light transmissive mode. Several methods can be used to control the opacity of the film, the most common being the incorporation of transparent tin-indium electrodes in the glass or plastic material sandwiching the PDLC.

An example of a PDLC product that has been known in the prior art is the sun roof developed for automobiles by General Motors Corporation, which enables a choice of light transmission levels ranging from fully opaque to almost fully transparent. The technique employs a four-layered PDLC-based film, consisting of two transparent electrode layers sandwiching a third 1 ml-thick film of liquid crystal impregnated resin. The fourth, inactive, layer of transparent plastic acts to protect the PDLC. A potentiated voltage may be delivered through the indium-tin oxide electrodes in the surrounding substrate. The voltage may be varied from 0 to 50 volts, representing the two extremes of working opacity. Light transmission through this sun roof varies from a low value to about 75%.

The PDLC film is made by dissolving LC in an uncured monomer resin and then polymerizing or curing the resin such that bubbles or droplets of LC spontaneously form and are uniformly dispersed throughout the matrix. The LC material is preferably birefringent nematic or birefringent chiral nematic, and the resin is a monomeric electron beam curable plastic precursor containing a mercaptan activated allyl compound, preferably triallyl isocyanurate and pentaerythritol tetratis (2-mercapto-propanoate). The resulting LC droplets which form in the cured polymer-LC matrix, ranging in diameter from about 0.2 microns upward, display positive dielectric anisotropy and/or positive diamagnetic anisotropy. By virtue of their dielectric and/or diamagnetic properties, the LC bubbles render the cured material capable of undergoing repeated thermally, electrically or magnetically induced transition between opaque and transparent states.

The performance achieved in both the "on" and "off" states is optimized by control of the refractive indices of the film component materials. The closer the refractive index of the liquid crystal microdroplets to the refractive index of the polymer material, the clearer the film will be. In addition, a correlation has been shown to exist between the LC bubble size and dispersion in the pre-cured solution, and the optical and operational characteristics of the resulting photopolymerized film. Among the most notable of these condition-dependent characteristics are threshold and operating voltages for optical transmission, contrast ratio, absolute transmissivity, and electro-optical response time. Several conditions of manufacture and production can be controlled to select for these two factors, including UV exposure intensity, exposure temperature, exposure wavelength, LC concentration and/or concentration of polymerization initiator.

Among the advantages of using the electron beam method for forming PDLCs are rapid curing, controlled cure processing parameters, and a relatively temperature-sensitive refractive index in the resultant film. Other methods exist for forming the film, among them thermal curing, ultraviolet curing, phase separation by cooling a thermoplastic-polymer liquid crystal mixture, and evaporation of solvent from a thermoplastic liquid crystal solution. Each process has problems associated with it.

When executed at high temperature, the thermal method often gives way to premature curing. For this reason, the polymer precursors must be cured at room temperature. Due to the lack of cross-linking in the chemical structure, thermoplastic-based films are highly temperature sensitive. High temperature usages of films are limited because of undue softening and melting of the material. Alternatively, once the substrates are mixed, a slow cure may result, leading to handling and aging problems of the film. Ultraviolet curing is not an ideal method because photoinitiators must be added to the mixture, shortening the film life. Special non-trivial protective steps may be taken to avoid this problem, but the production cost is significant.

When using the PDLC in a kitchen, for example, one requires that the PDLC have certain properties. The material must be shielded from extreme heat (such as in an oven) or cold (such as in a refrigerator). The material must also be protected from excessive accumulation of moisture. The material should be such as to permit the selection of an array of colorings under normal operating conditions. And it should allow for several types of switching mechanisms for use under all conditions.

It can be difficult to maintain reliable performance of a PDLC when it is used in environments where the temperatures regularly exceed the normal operating limits specified for the material. In applications where the material is likely to be harmed by heat, the four or five-layered PDLC film-glass composite may be isolated and shielded by incorporating it into one side of a closed, boxed installation structure, using a transparent insulating material such as PVC resin coated glass to moderate the amount of heat allowed to reach it.

In environments where the temperature is likely to fall below the recommended temperature range for PDLC materials, such as in a refrigerator, the temperature of the materials can be raised by passing heated air over their surfaces, as described in U.S. Pat. No. 4,775,221, the disclosure of which is incorporated by reference herein. The heater in such circumstances may be operated and controlled to within a predetermined range according to the measured average temperature of the cell as monitored by a sensor.

A relatively high-frequency electric field, applied to the dielectric layer, can remove moisture from an electrostatically addressed material, as described in U.S. Pat. No. 4,845,329, the disclosure of which is incorporated by reference herein. The apparatus comprises a transparent layer of dielectric material underlying the glass pane. A pair of transparent electrodes extends over the layer of dielectric material. For ease of fabrication, two electrodes are placed on the same side of the dielectric material.

The dielectric material cannot work properly in a cold state. When cold, the dielectric suffers from low light transmissivity in the transparent state. Another problem arises from the switching time required to change from the inactive opaque state to the active transparent state. The switching time is much longer at lower temperature.

U.S. Pat. No. 4,946,263, the disclosure of which is incorporated by reference herein, provides one means of keeping the liquid crystal display warm and also allowing for a separate driver to control the switching of the film.

The above-described problem is alleviated by applying a heating electric field of sufficiently high frequency to heat the dielectric material while not switching the device to the activated transparent state, thereby increasing the temperature of the device to decrease the switching time between the opaque and transparent states, and/or to increase the light transmissivity in the transparent state.

Since the PDLC material is a dielectric, it can be heated by application of high-frequency electric fields. The electro-optical switchable PDLC film responds to a low frequency in switching from the opaque to the transparent state.

The electric fields for driving and heating are generated by mixing a pair of voltages at controllable frequencies so as to develop a composite voltage using sum and difference frequency components, either both of appropriate high frequency or both of appropriate low frequency.

U.S. Pat. No. 4,946,263, the disclosure of which is incorporated herein, describes a pair of interdigitated electrodes located on the same side of the optical device for ease of fabrication. The electrodes are transparent, made of indium-tin-oxide covering the inner surfaces of the plates, and are on either side of the PDLC material. The density of the polarizable electric dipoles within the PDLC affects the effectiveness of heating; the higher the electric dipole density, the greater the amount of dielectric heating.

The frequency of the heating electric field should be at or above the range of several kHz, while the frequency of the driving electric field should be higher than a few kHz at most.

The frequencies of the driving and heating voltage sources can be combined by time division multiplexing, to avoid unwanted cross-over due to cross-coupling between two voltage sources.

To drive and heat the PDLC material simultaneously, a higher frequency will be used to heat the film and a low frequency will be used to switch the state of the film.

The electrodes should be located on one side and another electrode located on the other side of the PDLC with a filter to prevent cross-over located between the electrodes.

An electrochromic device consists of four layers, as described in U.S. Pat. No. 4,775,227, the disclosure of which is incorporated by reference herein. These layers include tin-oxide coated glass, rare earth dipthalocyanine (REDPC), membrane electrolyte REDPC, and tin-oxide coated glass. The REDPC is the electrochromic layer and contains a mixture of rare earths as obtained from a natural deposit without being individually separated. The REDPC is preheated to purify it and then sublimed into position as the device is assembled.

Using the above-described method, PDLC panes could be laminated, whereby one panel is blue in the "off" state and another PDLC panel in front is yellow. Thus, the overall panel would be seen as green, even though the panels are not green, but blue and yellow. There could be many more colors and shades created, as the opacity of the layers is varied.

FIG. 6 illustrates another embodiment of the invention, in which one controls the opacity of a plurality of windows to create a display. This embodiment comprises a billboard 51, or other similar structure, having a plurality of windows 53. Each window is made of the controlled-opacity material described above, and the opacity of each window is separately controlled by computer 55, so as to form patterns or messages. In FIG. 6, some of the windows, such as window 57, are opaque, and some of the windows, such as window 59, are transparent.

The embodiment of FIG. 6 can be realized with a building having a plurality of windows, wherein each window is made of the controlled-opacity material, and wherein the opacity of each window is separately controlled by automatic means. The building or billboard can also exhibit patterns which vary in color, by adjusting the voltages applied to each window.

While the invention has been described with respect to certain preferred embodiments, other arrangements are possible. The exact number of cabinets and appliances in the ensemble is not critical. Fewer than all of the cabinets and/or appliances can be provided with controllable-opacity windows. The ensemble can be provided with any number of control devices; each control could affect the opacity of one or more windows. The invention can also be adapted for use in rooms other than kitchens.

The embodiment of FIG. 6 is not limited to billboards or buildings, but can be practiced with other assortments of windows.

The above and other modifications, which will be apparent to those skilled in the art, should be considered within the spirit and scope of the following claims.

What is claimed is:

1. A kitchen ensemble having at least one appliance and at least one cabinet, said at least one appliance having a window and said at least one cabinet having a window, the appliance and cabinet defining interior regions and a common exterior region, the windows being permanently exposed to said common exterior region, said windows being made of a material of controllable opacity, wherein said windows are substantially clear in a first state and substantially opaque in a second state, and means for changing the states of said windows.

2. The ensemble of claim 1, wherein the changing means affects all of the windows in the kitchen.

3. The ensemble of claim 1, wherein the changing means affects fewer than all of the windows in the kitchen.

4. The ensemble of claim 1, wherein there are at least two distinct changing means for two windows, wherein one window can change state without affecting another window.

5. The ensemble of claim 1, wherein the controllable opacity material comprises a polymer-dispersed liquid crystal.

6. The ensemble of claim 5, wherein the polymer-dispersed liquid crystal is controlled by control means selected from the group consisting of electrical control means, ultrasonic control means, infrared control means, photoelectric control means, remote control means, auditory control means, and motion sensing control means.

7. The ensemble of claim 1, wherein the changing means includes a controller mounted to at least one of said appliance and said cabinet.

8. The ensemble of claim 1, wherein at least one of the windows has a frame, and wherein the changing means is mounted in said frame.

9. The ensemble of claim 1, wherein at least one appliance has a door, and wherein the changing means comprises a handle for said door.

10. A kitchen ensemble having a set of appliances and a set of cabinets, the appliances including at least a range and a refrigerator, wherein the refrigerator has a door with a window disposed in said door, wherein a plurality of the cabinets have windows disposed therein, the appliances and cabinets defining interior regions and a common exterior region, the windows being permanently exposed to said common exterior region wherein all of said windows are made of a material having a controllable opacity, and means for controlling the opacity of each of the windows, wherein contents of the refrigerator and of the cabinets can be viewed without opening any of the doors.

11. The ensemble of claim 10, wherein the controlling means affects all of the windows in the ensemble.

12. The ensemble of claim 10, wherein there are at least two distinct controlling means for two windows, wherein one window can change state without affecting another window.

13. The ensemble of claim 10, wherein the controllable opacity material comprises a polymer-dispersed liquid crystal.

14. The ensemble of claim 10, wherein the controlling means includes a controller mounted to at least one of said appliances and said cabinets.

15. A method of using a kitchen, the method comprising the steps of:
   a) providing a plurality of kitchen components, the kitchen components being selected from the group consisting of appliances and cabinets, wherein at least some of said components have windows, the appliances and cabinets defining interior regions and a common exterior region, the windows being permanently exposed to said common exterior region, wherein at least some of the windows are made of a material having a controllable opacity, wherein said material is normally substantially opaque, and
   b) periodically activating a controller to change the opacity of said material, thereby making at least some of the windows transparent while the controller is activated.

16. The method of claim 15, wherein the controller affects all of the windows in the kitchen.

17. The method of claim 15, wherein there are at least two distinct controllers for two windows, wherein one window can change state without affecting another window.

18. The method of claim 15, wherein the controllable opacity material comprises a polymer-dispersed liquid crystal.

19. A display apparatus comprising a plurality of windows, each window being made of a material having a controllable opacity, and a computer, the computer being connected to control simultaneously the opacity of all of said windows according to a predetermined program, wherein the computer comprises means for storing a pattern, and for reproducing said pattern by simultaneous control of opacities of selected windows.

20. The apparatus of claim 19, wherein the controllable opacity material comprises a polymer-dispersed liquid crystal.

21. The apparatus of claim 19, wherein the windows are disposed on a billboard.

22. The apparatus of claim 19, wherein the windows are disposed on a building.

23. A method of creating a display, the method comprising the steps of:
   a) providing a structure having a plurality of windows, each window being made of a material having an individually controllable opacity,
   b) simultaneously controlling opacities of selected ones of said windows, so as to reproduce a stored pattern.

24. The method of claim 23, wherein the structure comprises a billboard.

25. The method of claim 23, wherein the structure comprises a building.

26. A kitchen ensemble having at least one appliance and at least one cabinet, said at least one appliance having a window and said at least one cabinet having a window, said windows being made of a material of controllable opacity, wherein said windows are substantially clear in a first state and substantially opaque in a second state, and means for changing the states of said windows, wherein the changing means includes a controller mounted to at least one of said appliance and said cabinet.

27. A kitchen ensemble having at least one appliance and at least one cabinet, said at least one appliance having a window and said at least one cabinet having a window, said windows being made of a material of controllable opacity, wherein said windows are substantially clear in a first state and substantially opaque in a second state, and means for changing the states of said windows, wherein at least one of the windows has a frame, and wherein the changing means is mounted in said frame.

28. A kitchen ensemble having at least one appliance and at least one cabinet, said at least one appliance having a window and said at least one cabinet having a window, said windows being made of a material of controllable opacity, wherein said windows are substantially clear in a first state and substantially opaque in a second state, and means for changing the states of said windows, wherein at least one appliance has a door, and wherein the changing means comprises a handle for said door.

29. A kitchen ensemble having a set of appliances and a set of cabinets, the appliances including at least a range and a refrigerator, wherein the refrigerator has a door with a window disposed in said door, wherein a plurality of the cabinets have windows disposed therein, wherein all of said windows are made of a material having a controllable opacity, and means for controlling the opacity of each of the windows, wherein contents of the refrigerator and of the cabinets can be viewed without opening any of the doors, wherein the controlling means includes a controller mounted to at least one of said appliances and said cabinets.

30. A kitchen appliance having a window, the appliance defining an interior region and an exterior region, the window being permanently exposed to the exterior region, the window being made of a material of controllable opacity, wherein the window is substantially clear in a first state and substantially opaque in a second state, and means for manually changing the state of the window.

31. The appliance of claim 30, wherein the appliance is selected from the group consisting of a refrigerator and a range.

32. A kitchen cabinet having a window, the cabinet defining an interior region and an exterior region, the window being permanently exposed to the exterior region, the window being made of a material of controllable opacity, wherein the window is substantially clear in a first state and substantially opaque in a second state, and means for manually changing the state of the window.

* * * * *